United States Patent [19]

Kant

[11] Patent Number: 4,813,286
[45] Date of Patent: Mar. 21, 1989

[54] MECHANICAL-ELECTRICAL TRANSDUCER

[75] Inventor: Bernhard Kant, Hochheim, Fed. Rep. of Germany

[73] Assignee: VDO Adolf Schindling AG, Frankfurt am Main, Fed. Rep. of Germany

[21] Appl. No.: 75,179

[22] Filed: Jul. 20, 1987

[30] Foreign Application Priority Data

Jul. 18, 1986 [DE] Fed. Rep. of Germany ....... 3624240

[51] Int. Cl.⁴ ............................ G01L 7/08; G01L 9/04
[52] U.S. Cl. ........................................ 73/726; 73/720; 338/4
[58] Field of Search ................ 73/726, 727, 720, 721, 73/862.65; 338/4, 5

[56] References Cited

U.S. PATENT DOCUMENTS 4,548,086 10/1985 Kastel ................................... 73/726

FOREIGN PATENT DOCUMENTS 1924106 11/1970 Fed. Rep. of Germany ... 73/862.65
3026785 2/1981 Fed. Rep. of Germany .
0124769 9/1979 Japan ............................... 73/862.65

Primary Examiner—Donald O. Woodiel
Attorney, Agent, or Firm—Martin A. Farber

[57] ABSTRACT

In a mechanical electrical transducer strain-sensitive resistors (26, 27) are arranged on a strain member (7, 28, 38, 51, 53) in each case on sections (16–18; 32, 33; 45–48; 58–60) developed in transverse-beam fashion, which from the center of the strain member, are arranged tangentially to a circular arc extending concentrically to the center of the strain member. The transverse-beam sections are subjected on their surfaces substantially only to one-dimensional states of stress. The pairs of strain sensitive resistors are therefore stressed in a manner which does not simulate changes in pressure.

9 Claims, 3 Drawing Sheets

MECHANICAL-ELECTRICAL TRANSDUCER

FIELD AND BACKGROUND OF THE INVENTION

The invention refers to a mechanical-electrical transducer (1), particularly for the detection of pressure, having a leaf-like strain body (7, 28, 38, 51, 53) which has at least two recesses (11, 12; 41–44'; 54–56) and is connected with a mounting and the center of which can be deflected by an element (9), in particular one actuated by pressure, and on which there are arranged at least two strain-sensitive resistors (26, 27) one of which is preferably stressed in tension and the other in compression upon the deflection of the strain member.

Such a pressure transducer is already known (German Federal Republic OS No. 30 26 785). That pressure transducer contains a strain member having two recesses arranged parallel to each other between which a deflection strip extends. The strain member consists, for instance, of silicon or germanium and is connected at its center via a cylindrical pin and on its edges via an annular laminated element to a membrane which is acted on directly on one side by the pressure.

A pressure recorder having a pressure-sensitive element of monocrystalline silicon is also known. This element has a membrane of slight thickness with an edge of thicker development. In the membrane, strain-sensitive resistors are arranged. The membrane contains a middle part of thick development (German Federal Republic OS No. 25 49 001).

A pressure recorder for low pressures is also known which contains a membrane consisting of a soft cover layer which rests on a rigid edge. The edge is mechanically connected via two arms acting as transverse (bending) beams to a piston on one side of which the pressure to be measured acts. On the arms there are strain measurement strips for detecting the deformation of the arms. For the lengthening of the arms, notches which extend parallel to the arms are worked into the piston on both sides (German Federal Republic OS No. 30 04 031).

The relatively easily flexible strain member of the known mechanical-electrical transducer must be supported by a mount. It is technically possible to adapt the coefficient of thermal expansion of the strain member with sufficient precision to that of the mount only at very high expense. Thus changes in temperature in the mount and in the strain member result in different changes in volume. The changes in volume of the mount produce stresses within the strain member which, at the deflected central part of the membrane, lead to changes in the position of said part, by which changes in pressure are simulated.

SUMMARY OF THE INVENTION

It is an object of the invention so to develop a mechanical-electrical transducer of the aforementioned type that it is of a structure which can be economically produced, in which stresses which act from the mount of the strain member onto the latter do not simulate pressure effects on the strain-sensitive resistors.

According to the invention, the strain-sensitive resistors (26, 27) are arranged on the strain member (7, 28, 38, 51, 53) in each case on sections (16–18; 32, 33; 45–48; 58–60) developed in transverse-beam fashion, which, seen from the center of the strain member, are arranged tangentially to a circular arc extending concentrically to the center of the strain member. The transverse-beam sections are subjected on their surfaces substantially only to one-dimensional states of stress. The pairs of strain-sensitive resistors are therefore stressed in a manner which does not simulate changes in pressure.

The strain-sensitive resistors are preferably applied in thin-layer technique as strain measurement strips on the leaf-like strain member. The strain measurement strips preferably have a K factor within the range of 10 to 30. Such strain measurement strips can have a transverse sensitivity which is approximately as great as the longitudinal sensitivity. The disadvantages which occur with a radial arrangement of such strain measurement strips are avoided by the invention. The disadvantages of strain measurement strips of the above-mentioned type arranged on radial transverse (bending) beams result from the fact that the strain measurement strips are subjected to two-dimensional states of stress which, in case of high K factors, frequently lead to reductions in signal. This is true in particular when the strain measurement strips are arranged at the places having the greatest radial flexural stresses, as is actually desirable for reasons of high measurement sensitivity. With such an arrangement, only a smaller signal than expected is produced with the strain measurement strip stressed in each case by pressure. Since these disadvantages are essentially excluded in the mechanical-electrical transducer of the invention, the transducers can be made inexpensively in thin-layer technique with strain measurement strips which have high K factors. Use can be made of the technique for mass-production. The parts which for process reasons are developed planar can, in view of the inadequate inherent stability of the strain member, be clamped in mounts without the difficulties present in the known transducers with regard to high sensitivity occurring.

According to a feature of the invention, the strain-sensitive resistors (26, 27) are arranged as strain measuring strips of the strain member (7, 28, 38, 51, 53).

Further according to the invention, the strain-measuring strips are applied in thick-layer technique on the strain member (7, 28, 38, 51, 53).

In a preferred embodiment, it is contemplated that by the cutouts (11, 12; 41–44; 54–56), at least a first part of which is firmly connected to the mount, and a second part of which is connected to it by at least two transverse-beam sections (16–18; 32, 33; 45–48; 58–60), are formed the center of which can be deflected by an element; and that the transverse-beam sections, each of which has a thicker middle section (23) and two adjoining end sections (24, 25) bearing the resistors (26, 27), are arranged with their center lines (20, 21; 36, 37; 49; 61) in uniform spacings from each other tangentially to the circular arc (22; 62) extending concentrically to the center of the second part.

Frequently it is necessary for reasons of stability to produce the strain member and the mount from materials having different temperature coefficients. In such case, changes in temperature in the mount and in the strain member cause different changes in volume. The changes in volume of the mount produce within the strain member stresses which lead to changes in position of the central part of the membrane. Due to the changes in position, the pairs of strain-sensitive resistors in the transducer of the invention are acted on in a manner which does not simulate changes in pressure.

One advantageous embodiment of the transducer is characterized by the fact that the second part is developed in Z shape with a hole (8) in its center and that near the ends of the two rectangular sections (15, 16) extending in directions opposite each other, those of the second part (17, 18) are arranged each with an end section. In this way a particularly simple construction is obtained.

A further proposal contemplates that as second part a diagonal piece (29) having a hole (8) in its center have on both of its ends corner elements (34, 35) each of which is connected via two transverse-beam sections (32, 33) to additional corner elements (30, 31) connected firmly to the mount.

There should also be mentioned an embodiment which is characterized by the fact that the second part contains a rectangular membrane middle part (39) provided with a hole (8) in its center, on the corners of which middle part four rectangular sections (40) extend outward, they being each connected, via transverse-beam sections (45, 48) extending with their middle lines (49) parallel to the sides of the membrane middle part (39), to the first part developed as edge part (50).

It is also possible for the second part to contain a rectangular membrane middle part (39) which is provided with a hole (8) in its center, on the corners of which middle part four rectangular sections (40) extend outward, two of which are connected on diametrically opposite corners, each via transverse-beam sections (45, 47), to the first part which is developed as edge part and two being connected thereto on the other corners, each over sections of constant width. In this case, holes (52) can be arranged in a row in the sections. The holes make it possible in simple manner to change the stiffness of the membrane in order, for instance, to compensate for tolerances.

Finally, the second part can contain a triangular membrane central part (57) provided with a hole (8) in its center, the corners of which part are each connected via a transverse-beam section (58–60) to the first part. Independently of the shape, in particular of the second part, the end (9) of a pin (10) can, in accordance with one development of the invention, extend into the hole (8) present in the center of the membrane middle part, the pin being connected to a membrane (5) which can be acted on by a pressure fluid on one side and is connected to a cover (3) to which the strain member (7) is fastened.

BRIEF DESCRIPTION OF THE DRAWINGS

With the above and other objects and advantages in view, the present invention will become more clearly understood in connection with the detailed description of preferred embodiments, when considered with the accompany drawings, of which.

DETAILED DESCRIPTION OF THE PREFERRED EMBODIMENTS

Figure 1:
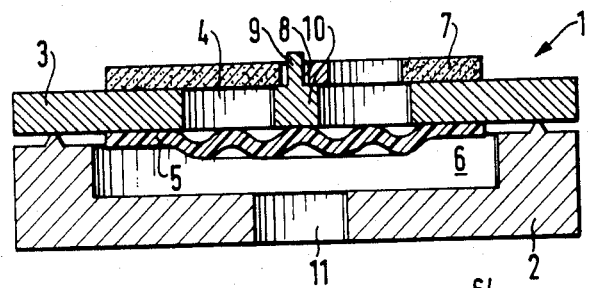
FIG. 1 is a cross-sectional view of a mechanical-electrical transducer.

A mechanical-electrical transducer 1 contains a cup-shaped housing part 2 which is closed by a cover 3. The cover 3 has a cutout 4 which is closed off by a membrane 5. The space 6 between housing part 2, cover 3 and membrane 5 is accessible to a pressure fluid via a passage 11 in the housing part 2.

The membrane 5 is arranged on the one side of the cover 3. It is attached via a flat edge strip, not further designated, to the flat region of the cover 3 adjoining the cutout 4. On the other side of the cover 3 there is fastened a strain member 7 within the center of which there is a hole 8 into which the stepped-down end 9 of a pin 10 extends, the other end of the pin being connected to the membrane 5. The cover 3 is the mount for the strain member 7 which is developed as a thin pressure-sensitive element and consists, for instance, of monocrystalline silicon into which strain-sensitive resistors are incorporated by diffusion.

When the space 6 is acted on by the pressure fluid, the membrane 5 curves outward somewhat. As a result, the pin 10 is pressed against the strain member 7 which becomes arched somewhat, in particular at its center. As a result, the resistors arranged on the strain member 7 are stressed in pairs in tension and compression. The resistors are located in a bridge circuit from which a voltage corresponding to the instantaneous pressure in the space 6 can be tapped.

Figure 2:
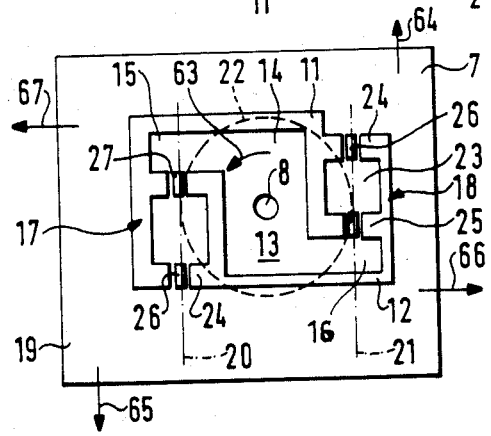
FIG. 2 is a view of a strain member arranged in the mechanical-electrical transducer of FIG. 1, seen from above.

FIG. 2 shows the leaf-like strain member 7 from above, it having two cutouts 11, 12 which surround a membrane center part 13 in which the hole 8 is located. The membrane center part 13 is of approximately Z shape. It has a basic rectangle 14 containing the hole 8. From the opposite ends of the basic rectangle 14 there extend at right angles in opposite directions towards the outside two rectangular sections 15, 16. Two transverse-beam sections 17, 18 connect the respective rectangular sections 15, 16 to the edge part 19 of the strain member 7. The transverse-beam sections 17, 18 are so arranged with respect to the circular hole 8 that their longitudinal axes 20, 21 extend at equal distances away tangentially to a circular arc 22 which concentrically surrounds the hole 8. The strain member 7 comprises, like all the following strain members described below, two parts, the first of which is connected to the holder while the part is connected to the first part via transverse-beam sections, also referred to as arms.

Each of the transverse-beam sections 17, 18 has a wide middle section 23 and two narrower end sections 24, 25 which pass into the edge part 19. On each of the end sections 24, 25 there are arranged the strain-sensitive resistors 26, 27 in the form of strain measurement strips which can be arranged in pairs in half-bridges of electric bridge circuits. The resistors 26, 27 are preferably applied by thin-layer technique to the strain member 7. It is favorable for the K factor of the resistors 26, 27 forming the strain measurements strips to be within the range of 10 to 30.

If the edge part 19 is distended a certain distance by a force coming, for instance, from the cover 3, then the end sections 24 follow along in the displacement of the portion of the edge part 19 connected with them. The transverse-beam sections are thereby moved depending on the direction of the displacement. The membrane central part 13 is swung around the end 9 of the pin 10 upon the displacement of the sections 17, 18. In this way a bending moment is produced in the end sections 24, 25 the vector of which moment is perpendicular to the plane of the drawing. The deformations of the first order resulting from this do not produce any signal in the resistors (26, 27) which are developed as strain measurement strips since they lie symmetrically to the neutral fiber with respect to said moment of flexure.

Figure 3:
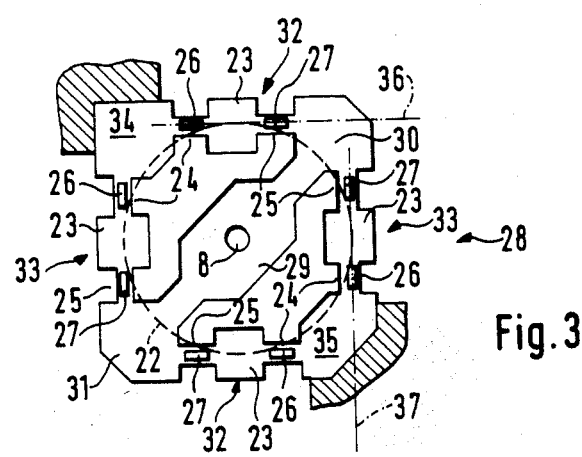
FIG. 3 is a view of another embodiment of a strain member, seen from above.

FIG. 3 shows a strain member 28 which contains a diagonal piece 29 provided in its center with the hole 8, said piece being connected at each of its ends to corner elements 30, 31. The corner elements 30, 31 are connected via in each case two transverse-beam sections 32, 33 to other corner elements 34, 35 which are firmly connected with a cover of the type shown in FIG. 1. The sections 32, 33 again have the construction shown in FIG. 2, i.e they contain a wide middle section 23 and two narrower end sections 24, 25, on each of which the strain-sensitive resistors 26, 27 respectively are arranged as strain measurement strips by the thin-layer technique. The sections 32, 33 are arranged tangentially at equal distances apart with respect to a circle 22 which extends concentrically around the hole 8, i.e. the center lines 36, 37 extending in the longitudinal directions of the sections 32, 33 form tangents to the circle 22.

Forces which are transmitted from the cover to the corner elements 34, 35 and move said elements into a different position bring about, via the sections 32, 33, a swinging of the diagonal piece 29 around the end 9 of the pin 10. In general, such stresses occur as the result of different temperature coefficients of the materials used for the strain members 7 and 28. The deformations caused by the changes in temperature do not produce any signals in the strain measurement strips since the latter lie in the neutral fibers indicated in connection with the arrangement according to FIG. 2.

The positions of the strain member parts shown in Figs. 2 and 3 are controlling for a lower temperature limit at which no pressure is to be simulated by temperature stresses. At higher temperatures the membrane center part 13 and the diagonal piece 29 are swung out of the positions shown.

Figure 4:
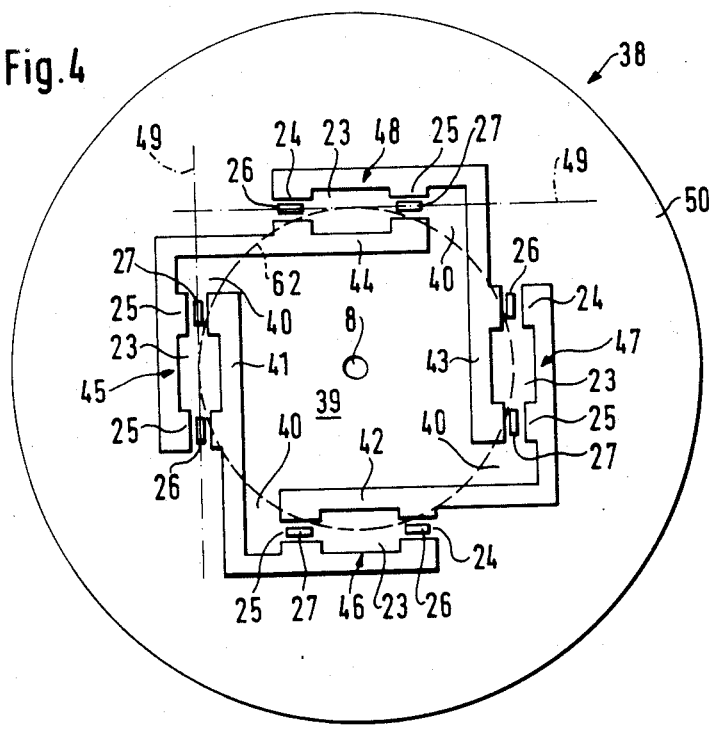
FIG. 4 is a view of a third embodiment of a strain member, seen from above.

The strain member 38 shown in FIG. 4 is of circular shape or at least so clamped in a holder that a circular surface remains free. A substantially square membrane center part 39 contains the circular hole 8. On the four corners of the membrane center part 39 there protrude in each case rectangular sections 40, the one side of which in each case is aligned with one side of the membrane center part 39. The membrane center part is limited by four L-shaped recesses 41, 42, 43, 44. The arms of in each case two recesses 41, 44; 44, 43; 42, 43; 42, 41 are spaced apart from each other since the radial spacings of the arms differ. Between the opposite arms there extend transverse-beam sections 45, 46, 47, 48 which consist in each case of the center section 23 and the end sections 24, 25. The end sections 24, 25 each bear the resistors 26, 27, developed as strain measurement strips.

The transverse-beam sections 45, 46, 47, 48 are so arranged with respect to the membrane center part 39 that their center lines 49 in their longitudinal directions tangentially contact a circular arc 62 which extends concentrically to the hole 8. If stresses from the holder act on the outer edge part 50 of the strain member 38 which thereby changes its position by a certain amount, then the arms follow along in these displacements and pull the membrane center part 39 along with them. The membrane center part 39 is thereby swung a distance around the end 9 of the pin 10. By the compensating movement, stresses of the resistors 26, 27 by which pressures are simulated are avoided.

Figure 5:
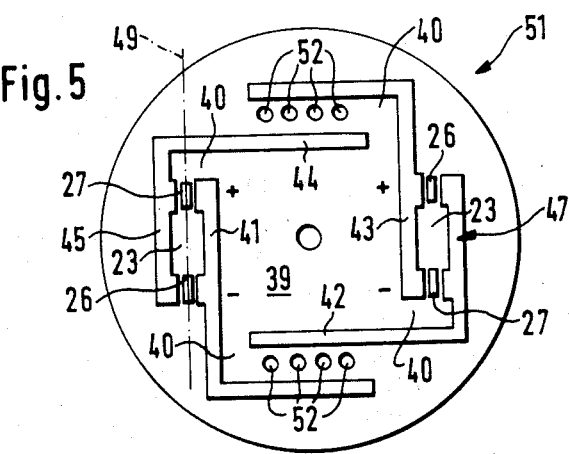
FIG. 5 is a view of a fourth embodiment of a strain member, seen from above.

The strain member 51 shown in FIG. 5 corresponds essentially to the strain member 38 shown in FIG. 4. Identical parts have been provided with the same reference numbers. In the strain member of FIG. 5, only the two transverse-beam sections 45, 46 with resistors 26, 27 developed as strain measurement strips are present. The other ends of the pairs of L-shaped recesses are at the same distance apart. The zones between the facing ends of the recesses 44, 43 and 41, 42 are intended for holes 52 by means of which the cross section of the strain member 51 can be adjusted to a desired value. Several holes 52 can be arranged in a row one alongside the other. The holes 52 can be suitably produced by laser beams. By the number and cross section of the holes 52 the stiffness of the zone between the facing ends of the recesses 43, 44 and 41, 42 is adjusted to a value which, with the forces transmitted from the holder to the strain member 51, makes an elastic swinging of the membrane center part 39 possible. Furthermore, in this way, with deviations within certain limits identical cross sections can be produced to compensate for the tolerances in the strain-member thicknesses. In particular in the case of the members 51 of sheet metal an adjustment of desired thicknesses is thereby obtainable. Forces which are transmitted as a result of changes in temperature from the holder to the strain member 51 produce a swinging of the membrane center part 39.

Figure 6:
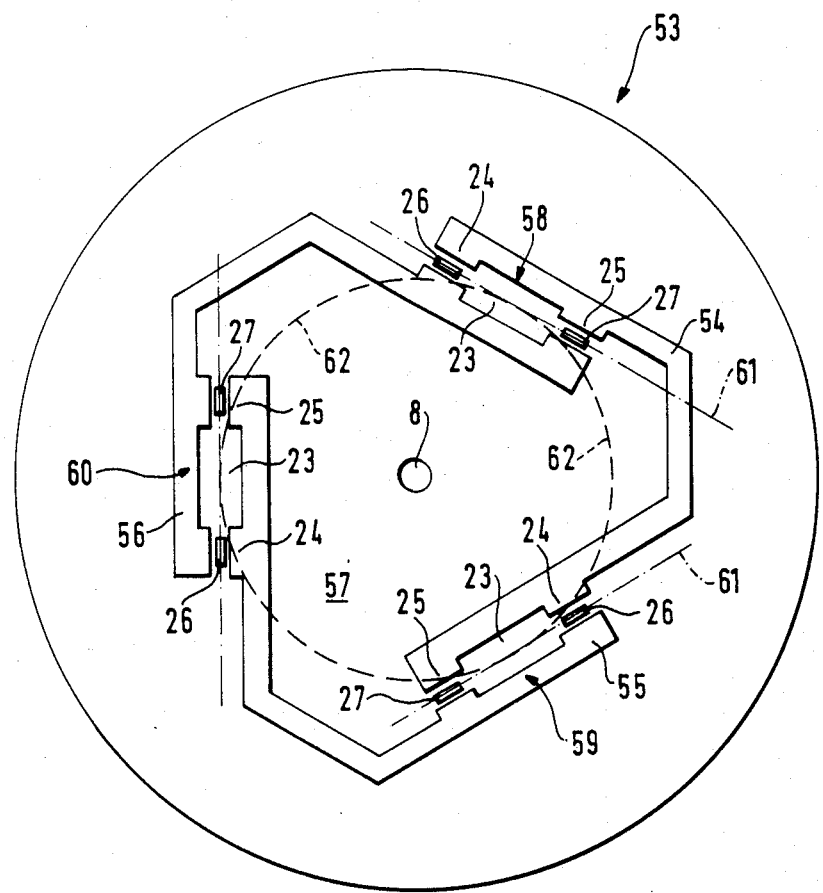
FIG. 6 is a view of a fifth embodiment of a strain member, seen from above.

Another embodiment of a strain member 53 is shown in FIG. 6. The strain member 53 contains three substantially V-shaped recesses 54, 55, 56 which surround a membrane center part 57 which contains the hole 8 in its center. The points of the V-shaped recesses 54, 55, 56 are in each case flattened. In addition, the ends of the recesses 54, 55 and 56 are pushed into each other. The ends of two recesses 54, 56 - 54, 55- 55, 56 are in each case opposite each other. The zones between the ends of the recesses 54, 56; 54, 55; 55, 56 are developed as transverse-beam sections 58, 59, 60, each of which consists of a central section 23 and two adjoining end sections 24, 25. The end sections 24, 25 bear the strain-sensitive resistors 26, 27, which are formed of strain measurement strips.

The transverse-beam sections 58, 59, 60 have center lines 61 which are tangent, at equal distances apart, to a circle 62 which concentrically surrounds the hole.

If forces which lead to a displacement of the edges are exerted on a strain member 53 as a result of changes in temperature from the holder which has a temperature coefficient different from the strain member 53, then the components of force transmitted via the transverse-beam sections 58, 59, 60 produce a swinging of the membrane center part 57, without pressure changes being simulated thereby in the resistors 26, 27.

FIGS. 4, 5 and 6 in the same way as FIGS. 1 and 2 show the positions of rest of the membrane center parts 13, the diagonal piece 29 and the membrane center parts 39 and 57 at a given temperature.

Instead of a membrane another element can also be used if other forces rather than pressures are to be measured. The element should then be so adapted to the case of use that it can be acted on by the force and carry out a movement proportional to it.

The swinging motion of the membrane center part 13 for the event of outwardly-directly displacements of the edge part 19 is indicated in FIG. 2 by an arrow 63. The four directions of displacement of the edge part 19 are designated by 64, 65, 66 and 67.

The mechanical-electrical transducers described above can be used as acceleration, pressure or force sensors, the strain members 7, 28, 38, 51 and 53 being deformed by the forces which occur. Strain measurement strips of great sensitivity can be used. The sensitivity and precision of the measurement is not impaired to any important extent if the transverse sensitivity of the strain measurement strips is practically as great as the longitudinal sensitivity. By the invention one avoids subjecting the strain measurement strips to two-dimensional states of stressing in which practically no output signals occur any longer. Two-dimensional states of stressing are avoided in the manner that the strain members are provided with transverse-beam like sections 16, 17, 18, 32, 33, 45, 46, 47, 48, 58, 59, 60 which bear the strain measurements strips and are arranged tangentially opposite the center of the strain members 7, 28, 38, 51, 53. Only unidimensional states of stress occur in these "transverse beams." The strain measurement strips are produced in thin-layer technique by the use of the technique. They have a planar structure. The planar parts must be clamped in mounts which have coefficients of thermal expansion which differ from the strain members. The deformations occurring as a result of the different coefficients of thermal expansion of the mount and the strain member can produce, in the tangential "transverse beams" 16, 17, 18, 32, 33, 45, 46, 47, 58, 59 and 60 only single-dimensional stresses by which the strain measurement strips are so stressed that essentially their longitudinal sensitivity enters into play.

I claim:

1. In a mechanical-electrical transducer, particularly for the detection of pressure, having a leaf-like strain member which has at least two cutouts and is connected with a mount; the transducer comprising:
   an element for deflecting a center of the strain member;
   at least two strain-sensitive resistors located on the strain member, one of said resistors is preferably stressed in tension and the other of the resistors being stressed in compression upon the deflection of the strain member; the improvement wherein
   the strain-sensitive resistors are arranged on the strain member in each case on sections developed in transverse-beam fashion, which, viewed from the center of the strain member, are arranged tangentially to a circular arc extending concentrically to the center of the strain member; and wherein
   two transverse beam segments in said strain member are defined by the cutouts, at least a first part of the strain member being firmly connected to the mount and a second part of the strain member being connected to the mount by said at least two transverse-beam sections, a center of the first and the second parts being deflected by said deflecting element;
   each of said transverse-beam sections has a thicker middle section and two adjoining end sections supporting said resistors with their center lines in uniform spacings from each other tangentially to the circular arc extending concentrically to the center of the second part; and
   the second part is developed in Z shape with a hole in its center, there being two rectangular sections extending in directions opposite each other, each of which has an end section.

2. The mechanical-electrical transducer according to claim 1, wherein
   the strain-sensitive resistors are formed as strain measuring strips on the strain member.

3. The mechanical-electrical transducer according to claim 2, wherein
   the strain-measuring strips are applied in thick-layer deposition technique on the strain member.

4. The mechanical-electrical transducer according to claim 1, wherein
   said second part comprises:
   a central part formed as a central membrane provided with a hole in its center; and
   transverse-beam sections,
   the corners of said central part being each connected via a transverse-beam section to the first part.

5. The mechanical-electrical transducer according to claim 1, wherein
   said deflecting elements is a pin;
   the end of the pin extending into the hole;
   said transducer including a membrane and a cover, the pin being connected to said membrane which is acted on by a pressure fluid on one side and is connected to said cover to which the strain member is fastened.

6. In a mechanical-electrical transducer, particularly for the detection of pressure, having a leaf-like strain member which has at least two cutouts and is connected with a mount; the transducer comprising:
   an element for deflecting a center of the strain member;
   at least two strain-sensitive resistors located on the strain member, one of said resistors is preferably stressed in tension and the other of the resistors being stressed in compression upon the deflection of the strain member; the improvement wherein
   the strain-sensitive resistors are arranged on the strain member in each case on sections developed in transverse-beam fashion, which, viewed from the center of the strain member, are arranged tangentially to a circular arc extending concentrically to the center of the strain member; and wherein
   two transverse beam segments in said strain member are defined by the cutouts, at least a first part of the strain member being firmly connected to the mount and a second part of the strain member being connected to the mount by said at least two transverse-beam sections, a center of the first and the second parts being deflected by said deflecting element;
   each of said transverse-beam sections has a thicker middle section and two adjoining end sections supporting said resistors with their center lines in uniform spacings from each other tangentially to the circular arc extending concentrically to the center of the second part; and wherein
   said second part includes a diagonal piece having a hole in its center, and having on both of its ends corner elements, there being two transverse-beam sections and additional corner elements connected firmly to the mount, the additional corner elements being connected to the first-mentioned corner element by said transverse-beam elements.

7. In a mechanical-electrical transducer, particularly for the detection of pressure, having a leaf-like strain member which has at least two cutouts and is connected with a mount; the transducer comprising:
   an element for deflecting a center of the strain member;

at least two strain-sensitive resistors located on the strain member, one of said resistors is preferably stressed in tension and the other of the resistors being stressed in compression upon the deflection of the strain member; the improvement wherein the strain-sensitive resistors are arranged on the strain member in each case on sections developed in transverse-beam fashion, which, viewed from the center of the strain member, are arranged tangentially to a circular arc extending concentrically to the center of the strain member; and wherein two transverse beam segments in said strain member are defined by the cutouts, at least a first part of the strain member being firmly connected to the mount and a second part of the strain member being connected to the mount by said at least two transverse-beam sections, a center of the first and the second parts being deflected by said deflecting element;

each of said transverse-beam sections has a thicker middle section and two adjoining end sections supporting said resistors with their center lines in uniform spacings from each other tangentially to the circular arc extending concentrically to the center of the second part; and wherein the second part comprises:

a rectangular membrane middle part provided with a hole in its center;

four rectangular sections extending outwardly from the corners of said middle part;

transverse-beam sections extending with their middle lines parallel to the sides of the membrane middle part, to the first part, said first part being formed as an edge part; and wherein said four rectangular sections are connected via said transverse-beam sections.

8. In a mechanical-electrical transducer, particularly for the detection of pressure, having a leaf-like strain member which has at least two cutouts and is connected with a mount; the transducer comprising:

an element for deflecting a center of the strain member;

at least two strain-sensitive resistors located on the strain member, one of said resistors is preferably stressed in tension and the other of the resistors being stressed in compression upon the deflection of the strain member; the improvement wherein the strain-sensitive resistors are arranged on the strain member in each case on sections developed in transverse-beam fashion, which, viewed from the center of the strain member, are arranged tangentially to a circular arc extending concentrically to the center of the strain member; and wherein two transverse beam segments in said strain member are defined by the cutouts, at least a first part of the strain member being firmly connected to the mount and a second part of the strain member being connected to the mount by said at least two transverse-beam sections, a center of the first and the second part being deflected by said deflecting element;

each of said transverse-beam sections has a thicker middle section and two adjoining end sections supporting said resistors with their center lines in uniform spacings from each other tangentially to the circular arc extending concentrically to the center of the second part; and wherein said second part comprises:

a rectangular membrane middle part provided with a hole in its center;

four rectangular sections disposed on the corners of said middle part and extending outward;

transverse-beam sections, two of said rectangular sections being connected on diametrically opposite corners, each via said transverse-beam sections, to the first part which is developed as an edge part; and wherein two of said rectangular sections are connected to the middle part on the other corners, each over sections of constant width.

9. The mechanical-electrical transducer according to claim 8, wherein a set of holes are arranged in a row in the sections to adjust a stiffness.

* * * * *